Feb. 23, 1932.  H. KURTH  1,846,879
HOLDER
Filed July 25, 1929
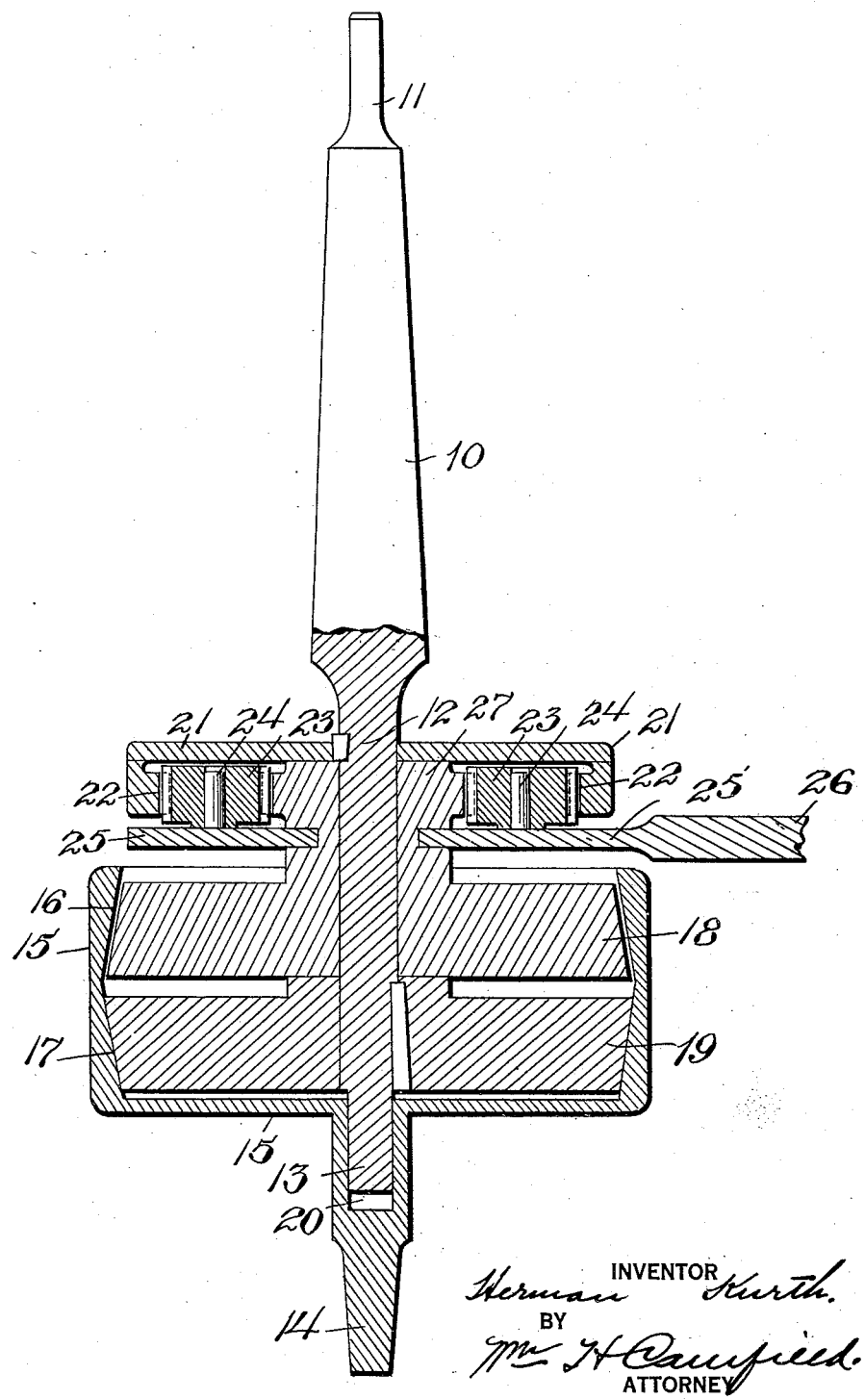

Patented Feb. 23, 1932

1,846,879

UNITED STATES PATENT OFFICE

HERMAN KURTH, OF NEWARK, NEW JERSEY

HOLDER

Application filed July 25, 1929. Serial No. 380,900.

This invention relates to an improved tap holder or tap fixture for drill presses. The invention is in that class of article in which a tap for making a thread is operated in one direction when the spindle of the drill press descends and is automatically reversed on its withdrawal when the spindle ascends.

The object of the invention is to provide a simple device of tap holder with but few parts and which is effective in its operation.

The invention will be more clearly understood from an inspection of the accompanying drawing which is a cross-section on a vertical plane through the centre of my improved tap-holder.

The holder or fixture comprises a shank 10 which is adapted for attachment at its end 11 with the spindle of a drill press. The shank 10 has an extension 12 on which it is rotatably supported. On the end 13 of the extension 12 is the bottom end 14 of the external conical clutch member 15. The end 14 supports the tap. Inside the conical clutch member 15 and facing its converging faces 16 and 17 are conical wheels 18 and 19. The clutch member 15 is proportioned so that when one conical wheel is in contact with it there is a clearance between the other conical wheel and the clutch member, this movement of the clutch member being allowed by providing a space 20 between the end 13 of the shank and the bottom of the recess in the extension or stud on the clutch member. The conical wheel 19 is secured to the extension 12 of the shank 10 and rotates with it and similarly secured and rotating with the shank is the internal gear 21. The internal gear has teeth 22 which are in mesh with the intermediate pinions 23 supported on studs 24 on the pinion support 25 which has an extension 26 which rests against the press or other machine on which it is mounted or it can be held by hand against rotation.

The intermediate pinions 23 are in mesh with the spur gear 27 which is loose on the shaft but which is secured to the upper conical wheel 16. The operation of this device is as follows:—

When a tap is placed on the holder by being secured to the bottom end 14 and the shank is fastened to the spindle of a drill press when the spindle descends and is rotating and the tap engages the work, the spindle forces the conical wheel 19 to engage the clutch member 15 and it is rotated with the shank to force the tap to rotate in the proper direction for entrance into the material. On the contrary when the spindle is raised and the tap is to be withdrawn from the work the shank raises and the conical wheel 19 is disengaged from the clutch member 15 and the conical wheel 16 is placed in engagement with the clutch member. The conical wheel 16 is rotated in a direction the reverse of the direction of the shank by reason of the spur gear, the intermediate gears and the internal gear forcing this reverse rotation. By this reverse rotation the tap is thus raised and rotated out of the work and this without reversing the rotation of the spindle of the drill press.

It will be evident that the device while primarily constructed for operating a tap on a drill press can be used, when found possible, on any other reversible tool fastened on the end of the clutch member in the place of the tap.

I claim:—

1. A holder of the kind described comprising a clutch member for holding a tool, a shank on which the clutch member is rotatable, a conical wheel rotating with the shank, a conical wheel loose on the shank, both conical wheels being within the clutch member and having a slight vertical play, a reversing mechanism connected with the loose conical wheel and the shank, and a support for said reversing mechanism extending from the holder for engagement with a stop in combination with a machine a part of which acts as said stop.

2. A holder of the kind described comprising a shank, a conical wheel fastened to the shank, a conical wheel adjacent the first conical wheel and loose on the shank, a clutch member with clutch faces opposite the wheels and having an extension for holding a tool, a spur gear on the loose wheel, a gear support rotatable on the device, intermediate gears on the support, an internal gear secured to the shank, the said gears being in mesh, and an extension on the gear support for holding said support against rotation.

In testimony whereof I affix my signature.

HERMAN KURTH.